United States Patent [19]

Silvey

[11] Patent Number: 5,469,038
[45] Date of Patent: Nov. 21, 1995

[54] METHOD FOR COMPENSATING FOR EFFICIENT VARIATIONS IN AN ELECTRIC MOTOR

[75] Inventor: Jeff L. Silvey, Hillsboro, Ohio

[73] Assignee: Cincinnati Milacron Inc., Cincinnati, Ohio

[21] Appl. No.: 240,128

[22] Filed: May 10, 1994

[51] Int. Cl.$^6$ ............................ B29C 45/77; G05B 11/01
[52] U.S. Cl. ....................... 318/632; 318/640; 364/476; 425/149; 425/135
[58] Field of Search .................................. 318/560–646, 318/254; 364/162, 148, 476, 140; 425/145–159, 135, 542, 593, 545; 264/40.5, 328.13, 40.1, 40.7, 40.6

[56] References Cited

U.S. PATENT DOCUMENTS

| | | | |
|---|---|---|---|
| 4,060,362 | 11/1977 | Wilson, III | 425/145 |
| 4,540,359 | 9/1985 | Yamazaki | 425/135 |
| 4,772,830 | 9/1988 | Kobari et al. | 318/563 |
| 4,837,490 | 6/1989 | Neko | 318/568.1 |
| 4,847,023 | 7/1993 | Neko | 264/40.1 |
| 4,851,170 | 7/1989 | Shimizu et al. | 425/135 |
| 4,988,273 | 1/1991 | Faig et al. | 425/145 |
| 5,030,395 | 7/1991 | Kamiguchi et al. | 425/159 |
| 5,062,785 | 11/1991 | Stroud, III et al. | 425/145 |
| 5,182,716 | 1/1993 | Stroud, III et al. | 364/476 |
| 5,258,918 | 11/1993 | Giancola | 364/476 |

*Primary Examiner*—Paul Ip
*Attorney, Agent, or Firm*—Stephen H. Friskney

[57] ABSTRACT

A method for compensating for variations in the operating efficiency of electric motors used in plastic processing machines. The current to the motor is continually monitored during all periods of operation to identify variations in the motor's actual efficiency as it relates to measurable machine performance. Normal operation of the electric motor is monitored to establish baseline current usage for the various periods of the operating cycle under given conditions. With a baseline established, variations in motor efficiency can be detected by monitoring the current during closed loop control of specific parameters and comparing the results to the baseline. Since the parameter is held constant by virtue of the closed loop, a deviation in current from the baseline indicates a change in efficiency. Based on the identified variance, the current to the motor during other (open loop) operations can be adjusted accordingly.

2 Claims, 3 Drawing Sheets

METHOD FOR COMPENSATING FOR EFFICIENT VARIATIONS IN AN ELECTRIC MOTOR

BACKGROUND OF THE INVENTION

1. Field of the Invention

The present invention relates to control of electric motors, and more particularly to a method of compensating for variations in the efficiency of electric motors used in the drive systems of plastics processing machines, such as injection molding machines.

2. Description of the Related Art

It is well known that electric motors produce heat during their operation. Usually the amount of heat produced increases with the increasing horsepower of the electric motor. This heat reduces the efficiency of the motor, resulting in less torque output for a given current input. Unless the control system includes means to compensate for this variation in motor performance, the performance of the mechanism driven by the motor will also be affected. As plastics processing machines increasingly use electric motors to power the drive systems of the machine, the problem of compensating for this variation in operating efficiency becomes more apparent.

In electrically driven plastics processing machines there may be as many as three or more high horsepower electric motors used to drive the primary mechanisms of the machine. For example, an electromechanically driven injection molding machine would likely have electric motors to power the clamp unit and injection unit (both translational and rotational movement of the injection screw). If the torque from the motors operating these system varies significantly, inconsistent molding machine performance will result; i.e., variation in clamp force, injection rate and pressure, plasticizing time and/or back pressure.

Cooling systems for electric motors have been proposed in an attempt to narrow the operating temperature range and thereby limit variations in motor performance. While the various concepts for motor cooling can provide some benefit, no single approach is fully effective for the wide range of operating environments. Another drawback to implementing a cooling system in injection molding machines is the extensive modifications often required to adapt the motors to air or liquid cooling; these modifications can be complex and expensive. A means of controlling motor performance without the expense of additional components is highly desirable.

SUMMARY OF THE INVENTION

Accordingly, it is an object of the present invention to overcome the shortcomings of the prior art and provide a method of controlling electric motor operation to compensate automatically for variations in the operating efficiency of the motors used in plastic processing machines, providing more consistent machine performance.

The present invention accomplishes the stated objective by continually monitoring the current to the motor during all periods of operation to identify variations in the motor's actual efficiency—as related to performance—and adjust the current to compensate for such variations. Since measurement of current can be done simply and reliably with various known methods, the use of expensive force/pressure transducers can be minimized and, perhaps, avoided entirely.

For example, the present invention can be used in an electric injection molding machine to compensate for efficiency/performance variations in key drive systems, such as the clamp unit. Normal operation of the clamp motor is monitored to establish baseline current usage for the various periods of the operating cycle; i.e., in some periods the velocity of the clamp is controlled, at others clamp tonnage (force) is important. With an operational baseline established, variations is motor efficiency can be detected by monitoring the current during closed loop velocity control; since velocity is maintained from cycle to cycle, a deviation in current from the baseline during this interval indicates a change in efficiency. Based on the identified variance, the current to the clamp motor during times when tonnage is critical can be adjusted accordingly.

DESCRIPTION OF THE PREFERRED EMBODIMENT

Although the present invention is applicable to various plastic processing machines, the following description is presented in connection with an injection molding machine having an electromechanical drive system. Accordingly, a brief description of this type of machine is useful in understanding the present invention.

Figure 1:
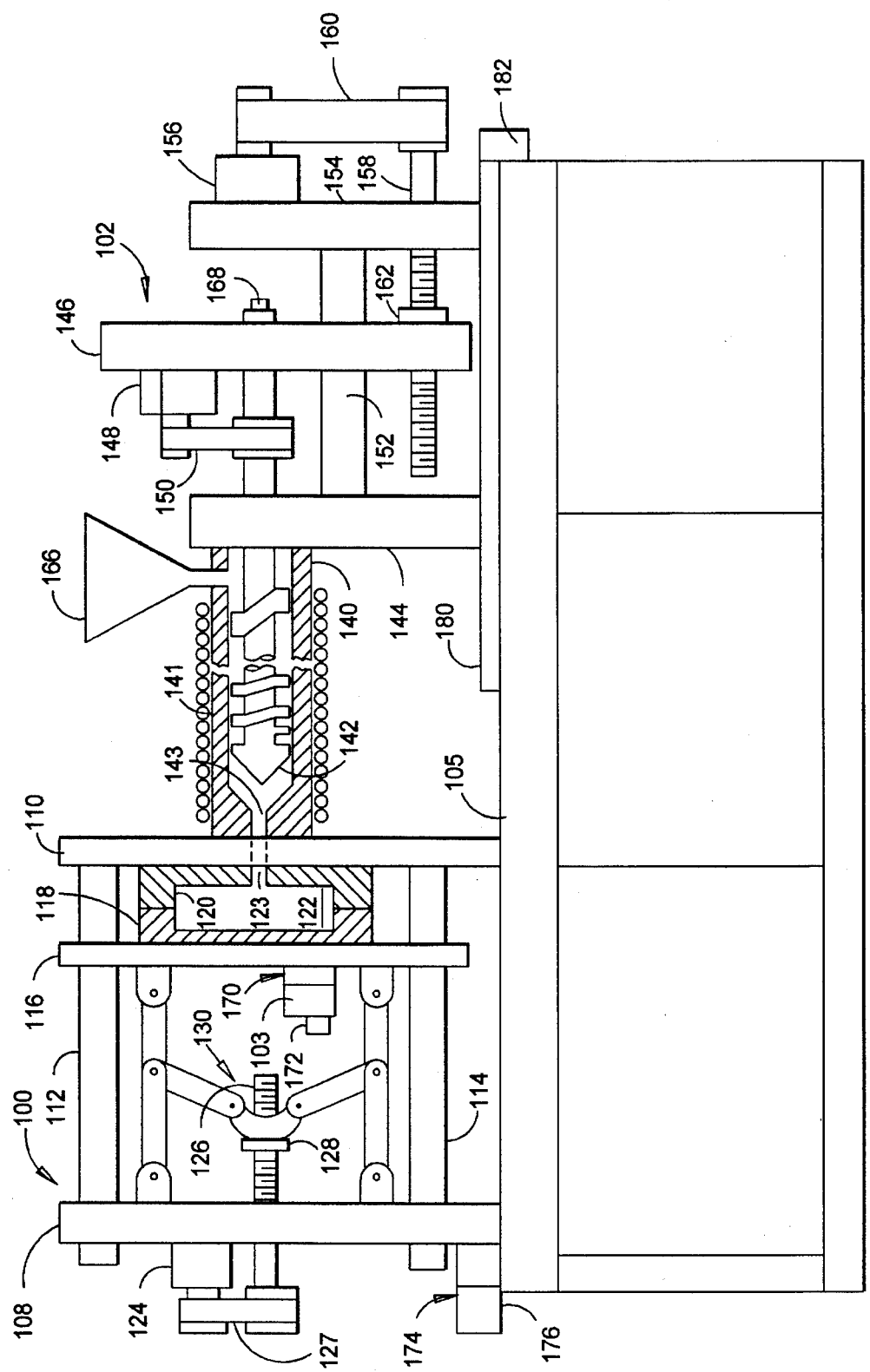
FIG. 1 is a front elevational view of an injection molding machine controlled according to the method of the present invention.

FIG. 1 illustrates an injection molding machine to which the control method of the present invention is applied. The machine is comprised of a clamp unit 100 and an injection unit 102, each mounted on a base 105.

The clamp unit 100 is comprised of a rectangular stationary platens 110 and die height platen 108 which are connected by four tie bars at the platen corners. Two tie bars 112 and 114 are shown. The tie bars operate as guides for a movable platen 116. Mold halves 118 and 120 are affixed to the platens 116 and 110, respectively; when the clamp is in the closed position shown, a mold cavity 122 is formed between the mold halves. A gate opening 123 passes through mold half 120 and stationary platen 110 to permit the injection of a plastic melt into the mold cavity 122. The moving platen 116 is operated by a clamp motor 124 mounted on the stationary platen 108. The motor 124 is connected to a ball screw 126 by a drive belt 127. A gear drive or other mechanical coupling may also be used. The ball screw nut 128 is mounted in a toggle mechanism 130 which provides a mechanical advantage for the motor 124 in operating the clamp unit 100.

The injection unit 102 includes an extruder mechanism comprised of a tubular barrel 140 with an extruder screw 142 rotationally and translationally mounted therein. The screw passes through a bore in a stationary member 144, with one end of the screw 142 being rotatably secured in a movable member 146. Rotational motion of the screw 142 is provided by an extruder motor 148 mechanically connected to the screw by a drive belt 150; rotation may also be implemented by any other suitable mechanical device. The movable member 146 rides on a pair of parallel bar guides, one of which is shown at 152, connected between the stationary members 144 and 154. An injection motor 156 mounted on the member 154 is connected to a ball screw 158 by a drive belt 160. The ball screw nut 162 is mounted in the movable member 146; and therefore, the motor 156 is operative to provide linear motion to the member 146 and the extruder screw 142 toward and away from the stationary platen 110.

An ejector unit 170 is integrated with the mold and is operative to eject the finished molded part as the mold opens. The ejector unit 170 is coupled to an ejector motor 103. The machine control (not shown) activates the motor 103 at the appropriate time in the injection molding cycle. The ejector unit 170 is preferably under servocontrol to accommodate the various requirements and operations of different molds.

A die height unit 174 is typically integrated into the tie bars and platen 108 shown in FIG. 1. The die height unit 174 provides an adjustment of the spacing of platen 108, including toggle mechanism 130 and movable platen 116, relative to the stationary platen 110 to accommodate different molds having different mold thicknesses when the molds are in the closed position. The die height unit 174 is controlled by a die height motor 176. The die height adjustment can be manually controlled by the operator which results in the machine control producing forward or reverse command signals to the motor 176.

The injection sled 180 generally rides on tracks (not shown) on the base 105 and supports the entire injection unit 102, thereby permitting the injection unit 102 to be moved toward and away from the stationary platen 110. The injection sled is mechanically coupled to a sled motor 182. Again, the operation of this unit can be manually controlled by the operator which results in the machine control providing forward or reverse command signals to the motor 182. It should be noted that the various motors noted above could be AC induction, brushed AC or DC, brushless (permanent magnet) AC or DC, or any other type, as might be best suited for the particular application.

Figure 2:
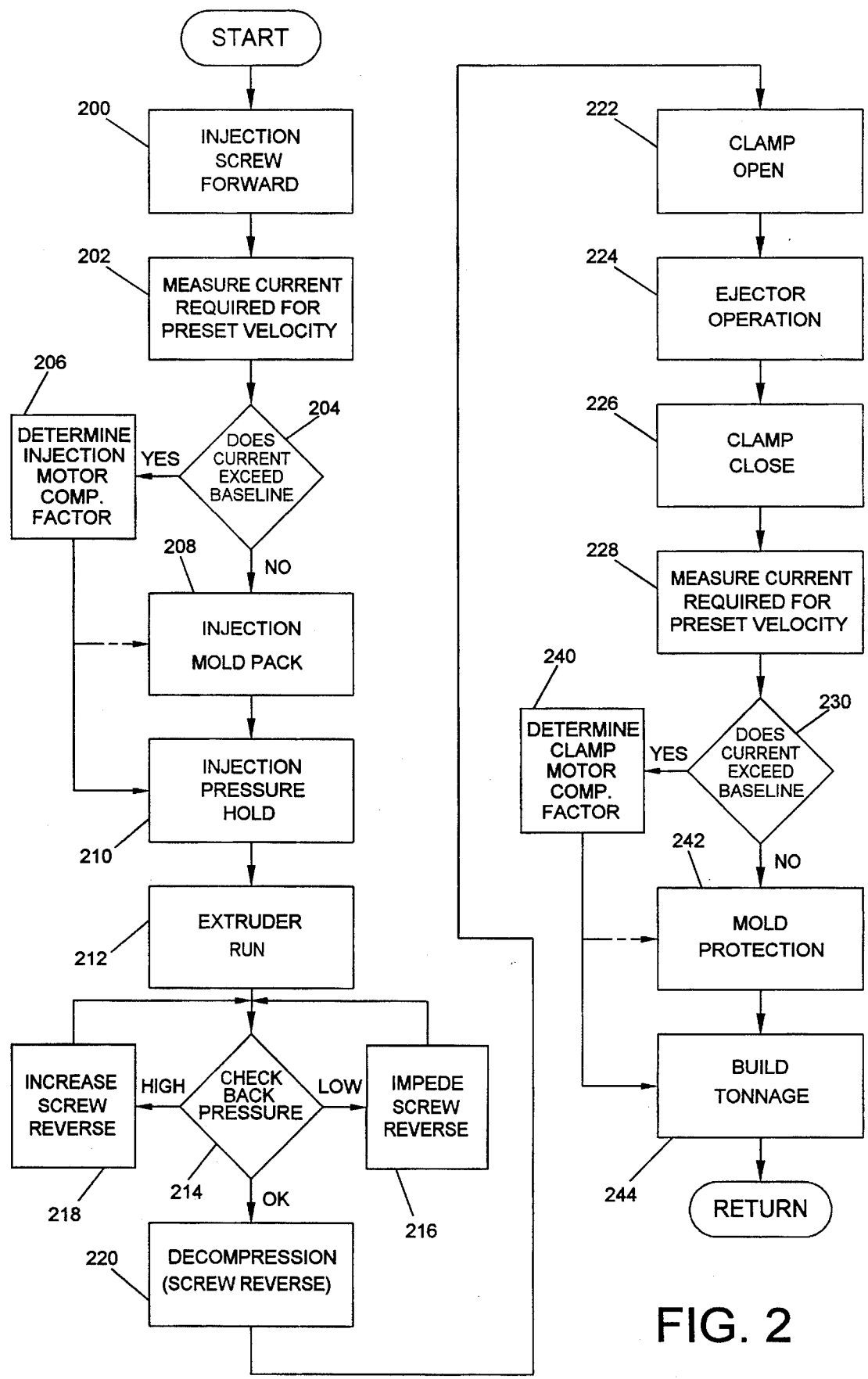
FIG. 2 is a flow chart of the operational steps that take place when the control method of the present invention is applied to the operating cycle of the injection molding machine shown in FIG. 1.

The specific machine elements and operational steps associated with the control method of the present invention are identified in FIGS. 1 & 2. The control method involves first establishing an operational baseline for the various motors of the plastics processing machine by measuring and storing the magnitude of the current applied to the relevant motors during critical periods of operation under normal or established conditions. In an injection molding machine, the motors of interest would typically be the clamp motor 124 and/or the injection motor 156 since these motors are periodically required to maintain a force or pressure. The control method is particularly applicable to periods where the force is maintained without feedback and compensation related to actual performance; i.e., there is no closed loop control for that particular machine function.

Figure 3:
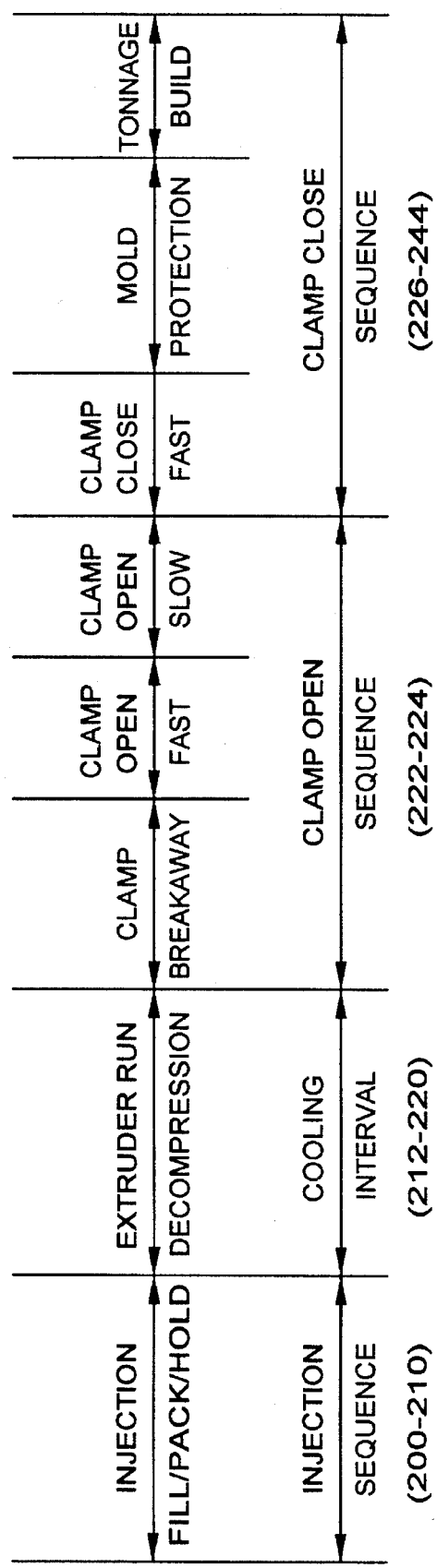
FIG. 3 is a sequence chart for the injection molding machine shown in FIG. 1, identifying the periods of a single operating cycle with reference to the steps of FIG. 2.

Referring now to FIGS. 1–3, a cycle of operation will briefly be described starting with the clamp unit 100 in the illustrated closed position with full force (tonnage) applied to the mold. At this point in time, solid thermoplastic, thermoset or other material from the hopper 166 will have been plasticized by the screw 142 to form a quantity of liquid phase plastic melt or a "shot" in front of the screw. Plastication time is optimized by providing external heat to the barrel 140, typically by a plurality of circumferentially mounted heater bands 141. To initiate the first step 200 and begin the injection sequence, the machine control provides a velocity command to the motor 156 in order to move linearly member 146 and screw 142 forward, towards the platen 110. As the screw 142 moves linearly in the barrel 140 toward the stationary platen 110, the plastic melt is injected through the orifice 143 and gate opening 123 into the mold cavity 122. As indicated in step 202, the current to the injection motor 156 is measured during this interval since the forward movement of the screw 142 is typically performed at a controlled velocity based on position feedback. The measured current is compared against the baseline data for this same action in step 204. If it exceeds the baseline, the magnitude of the difference is used to determine an appropriate efficiency compensation factor, step 206, for subsequent operations of motor 156.

When the screw 142 completes its linear motion, the machine control transfers to the pack interval, as indicated in step 208. During the fill interval and subsequent pack and hold intervals of the injection sequence, the extruder motor controller is provided with a zero velocity signal to keep the extruder screw 142 from rotating due to the linear forces exerted on the screw 142. In the pack interval, the object is to continue to push the material into the mold to complete the mold filling process. Most likely, the process will require pressure control during this period; the efficiency factor determined by step 206 can be used to make sure the desired pressure is achieved.

At the end of a predetermined period of time, marking the end of the pack interval, the machine control transfers to the hold interval, as indicated by step 210, where the injection pressure is maintained. The pack and hold intervals require that the injection motor 156 maintains a high torque (using high current) with little or no rotation; this condition generates significant heat in both the motor 156 and the components of the electronic drive 46. As motor temperature rises, the torque available at a given current decreases, and the current has to be increased to maintain torque, generating additional heat. Accordingly, the efficiency factor determined by step 206 is particularly useful to make sure the desired pressure is achieved, in the event actual pressure feedback is not provided.

After a predetermined period marking the end of the hold interval, the machine control transfers to a cooling interval for a further period of time while the molded part cools. During the cooling interval, the machine control initiates step 212, extruder run, in which the extruder motor 148 is activated to extrude a new shot of molten material to the front of the screw 142. At the same time, the injection motor 156 must be operated to move the screw 142 away from the platen 110 while maintaining a predetermined pressure on the molten plastic material, i.e., a predetermined back-pressure on the extruder screw 142. This is shown by decision block 214 and alternative steps 216 and 218. The machine control causes the extruder screw motor 148 to rotate the screw to plasticize more plastic material and carry it to the front of the screw adjacent to the orifice 143, generating a back pressure. The back pressure is measured and compared against a preset level (step 214). If the measured pressure is low, the machine control will cause the rotation of injection motor 156 to be impeded (step 216) in order to increase the back pressure on the screw 142. If the back pressure reading is higher than desired, the rotation of motor 156 is increased, moving the screw 142 away from the platen 110 (reverse—step 218) to reduce the back pressure. In either case, when the back pressure reaches the desired level, the motor 156 governs rotation of the ball screw 158, moving the feed screw 142 away from the platen 110 while maintaining the predetermined back-pressure. Consequently, as the screw 142 rotates to build a shot of molten plastic, it will be moved away from the platen 110 at a controlled back pressure until the full shot of plastic material is extruded.

When the screw 142 reaches a predetermined final position, the machine control stops the operation of the extruder motor 148 and issues a velocity command to the drive control for the injection motor 156 to move the screw further back, thereby relieving the pressure on the molten plastic material due to the back-pressure from the screw 142. This is generally referred to as decompression, step 220.

At the end of the molded part cooling interval, the control also provides a velocity command signal to the clamp motor 124 to shift the movable platen 116 in the direction away from the stationary platen 110 to open the mold by opening the clamp unit 100, step 222. While the clamp 100 is opening the mold, the control will provide command signals to the ejector unit 170 and ejector motor 103 to actuate the mold part ejector mechanism (not shown) carried by the mold half 118, as indicated by step 224. The finished part is ejected from the mold, and the ejector motor 103 then returns the part ejector mechanism to its original position. The clamp open sequence is complete when a fully opened mold clamp position is detected.

The control next begins the clamp close sequence by giving command signals to initiate movement of the platen 116 in the opposite direction to bring the mold halves back together. The control will generate a velocity command to close rapidly the clamp, bringing the mold halves together, step 226. As indicated by step 228, the current to the clamp motor 124 is measured during this interval since the forward movement of the platen 116 is typically controlled to maintain a preset velocity based on position feedback. The measured current is compared against the predetermined baseline data for this same action in step 230. If it exceeds the baseline, the magnitude of the difference is used to determine an appropriate efficiency compensation factor, step 240, for subsequent operations of motor 124.

After movable platen 116 has been moved at a rapid rate toward stationary platen 110 to a predetermined position, a command signal representing a low velocity is provided until a preset position is detected and contact of the mold halves is imminent. This low velocity movement is for mold protection, step 242. Under normal circumstances, the mold halves will be brought together to the fully closed position. However, if there is interference between the mold halves, a torque limit control will override the velocity control and reduce current to the motor to reduce motor velocity and motion to protect the mold halves from damage caused by the interference.

Assuming the mold halves reach the fully closed position, the torque command value is increased, and a command is given to move the toggle to a lock-over position (shown in FIG. 1), building the required tonnage (force) for molding, step 244. More specifically, the mold clamping force is preset at a desired level and is determined by the torque applied to the ball screw 126 by motor 124. Based on the efficiency factor determined by the recent forward movement, the current to the motor is adjusted so that the desired force is applied. The machine has now completed the clamp close sequence and is ready to begin another operating cycle.

Although the motors may eventually reach a stable, sustained operating temperature, the temperature rise in the motors is gradual. The method of the present invention provides an effective way of compensating during each cycle of operation for changes in efficiency that result from changes in motor operating temperature. Accordingly, the method can be used where there is no means for controlling motor temperature, or in combination with cooling systems that have limited capabilities.

While the invention has been illustrated in some detail according to the preferred embodiment shown in the accompanying drawings, and while the preferred embodiment has been described in some detail, there is no intention to thus limit the invention to such detail. On contrary, it is intended to cover all modifications, alterations, and equivalents falling within the spirit and scope of the appended claims.

What is claimed is:

1. A method for dynamically compensating for variations in the operating efficiency of an electric motor used to drive a mechanism in a plastics processing machine for a cycle of operation that includes (i) a closed loop control period during which current supplied to the motor is controlled to achieve a preset operating parameter and (ii) an open loop control period during which a predetermined current is supplied to the motor, comprising the steps of:

(a) determining a baseline current supplied to the motor during the closed loop control period that achieves the preset operating parameter under established operating conditions;

(b) measuring the current supplied to the motor during the closed loop control period for each cycle of machine operation;

(c) comparing the measured current to the baseline current for the closed loop control period to ascertain a deviation from the baseline current due to changes in the operating efficiency of the motor;

(d) determining an efficiency compensation factor based on the deviation ascertained in step (c); and (e) adjusting the predetermined current supplied to the motor during the open loop control period based on the compensation factor determined in step (d), thereby assuring consistent machine performance during the open loop control period in each cycle.

2. A method for dynamically compensating for variations in the operating efficiency of an electric motor used to drive a clamp mechanism in an injection molding machine for a cycle of operation that includes (i) a clamp close interval during which current supplied to the motor is controlled closed loop to achieve a preset clamp velocity and (ii) a tonnage build interval during which a predetermined current is supplied to the motor, comprising the steps of:

(a) determining a baseline current supplied to the motor during the clamp close interval that achieves the preset velocity under established operating conditions;

(b) measuring the current supplied to the motor during the clamp close interval for each cycle of machine operation;

(c) comparing the measured current to the baseline current for the clamp close interval to ascertain a deviation from the baseline current due to changes in the operating efficiency of the motor;

(d) determining an efficiency compensation factor based on the deviation ascertained in step (c); and (e) adjusting the predetermined current supplied to the motor during the tonnage build interval based on the compensation factor determined in step (d), thereby assuring consistent machine performance during the tonnage build interval in each cycle.

* * * * *